July 2, 1957  E. E. HANS  2,797,931
VEHICLE STABILIZING AND ANTI-SKIDDING DEVICE
Filed Aug. 31, 1953  2 Sheets-Sheet 1
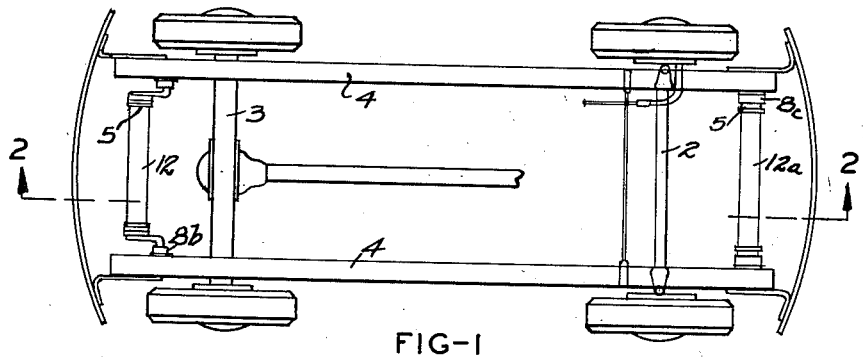
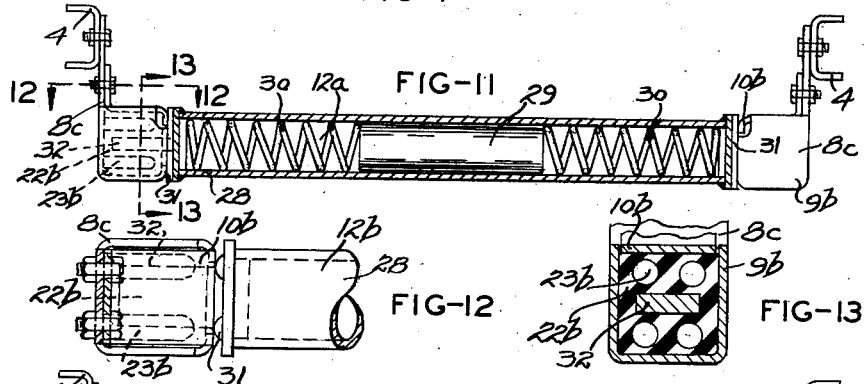
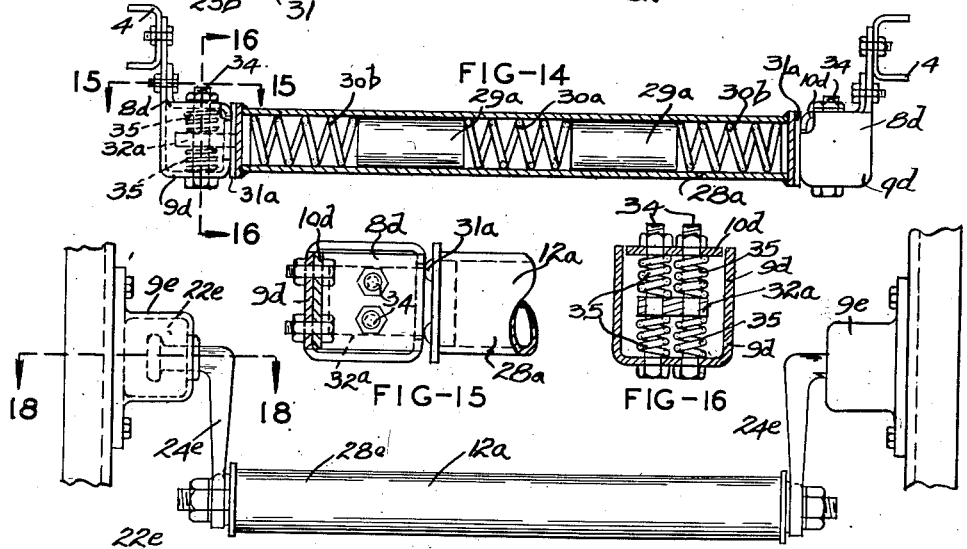
INVENTOR.
Edmund E. Hans.
BY

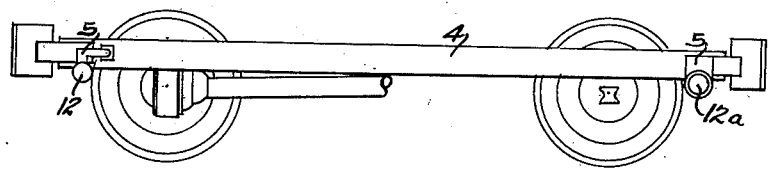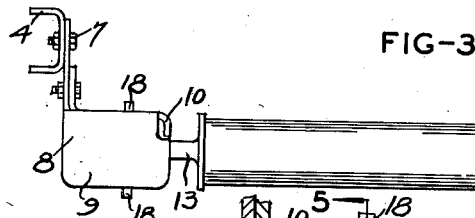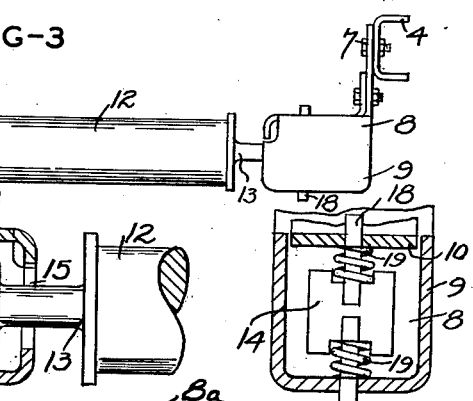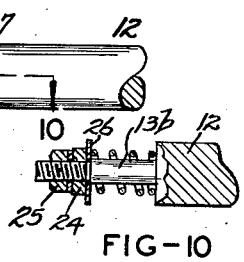

United States Patent Office 2,797,931
Patented July 2, 1957

2,797,931

VEHICLE STABILIZING AND ANTI-SKIDDING DEVICE

Edmund E. Hans, Detroit, Mich.

Application August 31, 1953, Serial No. 377,537

4 Claims. (Cl. 280—150)

This invention relates to stabilizing devices for motor vehicles, and refers particularly to a stabilizing device wherein one or more weights are utilized both to dampen sudden vertical movements and also to counteract any skidding tendency of the vehicle.

It is an object of the invention to provide a stabilizing device including mountings for rigid attachment to opposite sides of a vehicle frame, and to provide resilient support means in each mounting for one extremity of a stabilizer member carrying at least one weight so that the member and weight are permitted limited vertical movement relative to the frame to dampen sudden vertical movements of the latter. In cases where the stabilizer member and weight are integral the said member is slidable transversely of the frame and is normally held central between the mountings, and when the weight or weights are slidable in the stabilizer member and are normally held central therein the member is held against movement by and between the mountings. In either event it is the movement transversely of the frame of the weight or weights which counteracts any skidding tendency.

Having thus briefly and broadly stated some of the objects and advantages of the invention I will now describe some of the preferred embodiments with the aid of the accompanying drawings, in which:

Figure 1 is a plan view, and

Figure 2 is a section on the line 2—2 of Figure 1, showing a chassis on which two modified forms of the invention are mounted, one adjacent each end of the chassis.

Figure 3 is an enlarged front view of one embodiment of the invention wherein a unitary, laterally movable stabilizer member is supported for vertical movement in mountings on the frame.

Figure 4 is an enlarged vertical section of one of the mountings shown in Figure 3, and Figure 5 is a section on the line 5—5 of Figure 4.

Figure 6 shows a modified form of mounting for supporting one extremity of the laterally movable stabilizer member shown in Figure 3.

Figure 7 is a section on the line 7—7 of Figure 6.

Figure 8 is another modified form of mounting for supporting one extremity of the laterally movable stabilizer member shown in Figure 3.

Figures 9 and 10 are sections on the lines 9—9 and 10—10 respectively of Figure 8.

Figure 11 shows a modified form of the invention wherein the stabilizer member is held against lateral movement between opposed mountings and is supported for vertical movement thereby.

Figures 12 and 13 are enlarged sections on the lines 12—12 and 13—13 respectively of Figure 11.

Figure 14 is another modification wherein the stabilizer member is held against lateral movement between opposed mountings and is supported for vertical movement thereby.

Figures 15 and 16 are enlarged sections on the lines 15—15 and 16—16 respectively of Figure 14.

Figure 17 is another modified form of the invention wherein the stabilizer member is held against lateral movement between opposed mountings and is supported for vertical movement thereby.

Figure 18 is a section on the line 18—18 of Figure 17.

Figures 1 and 2 show a vehicle chassis including a front axle 2 and a rear axle 3 and side frame members 4 mounted thereon. A stabilizing device 5 is shown mounted on and extending transversely between the frame members 4 both in front of the front axle 2 and behind the rear axle 3.

Figures 3 to 10, inclusive, show modifications of the invention wherein a unitary stabilizing member 12 including an integral weight centrally of its width is supported at opposite extremities for limited movement transversely of the vehicle in mountings rigidly secured to the frame members 4; and Figures 11 to 18, inclusive, show modifications wherein a stabilizer member 12a is held against lateral movement between its mountings and has one or more weights therein for movement transversely of the vehicle. In both cases the mountings include resilient means permitting limited vertical movement of the stabilizer member 12 or 12a.

Referring to Figures 3, 4 and 5, secured as by bolts 7 to the frame members 4 are the upper extremities of identical mountings 8, each of which consists in part of a casing 9 having a cover 10 secured thereon, and formed through each casing 9 and cover 10 is a vertical slot 11. Moreover the slots 11 in each mounting are in vertical alignment. 12 denotes a unitary stabilizer member having a weight integral therewith centrally of its length, a shank 13 projecting from each extremity and a support 14 upon and usually integral with the outer end of each shank. Each shank extends through an opening 15 formed in the inner face of one of the casings 9 wherein its support 14 is housed. Formed in the outer side of each support 14 is a recess 16 to receive one extremity of a helical spring 17 the opposite extremity of which bears against the back wall of one casing 9. Thus the springs 17 in the opposed mountings 8 tend to retain the stabilizer member 12 centrally between the said mountings and the length of the shanks 13 permits limited axial movement of the stabilizer member 12. Thus if the vehicle tends to skid the member 12 is moved by inertia transversely between the mountings 8 so that one spring 17 becomes more compressed than the other. However as soon as the skidding tendency ceases the spring 17 under greater compression returns the member 12 to its central position.

Secured to the support 14 in each mounting 8 are vertically aligned pins 18 each of which projects through one of the slots 11, and arranged around each pin 18 and extending between the support 14 and the inner face of the casing 9, or the inner face of the cover 10, is a helical spring 19. These springs tend to maintain the supports 14 centrally of the height of their mountings 8, and when a bump in the road is suddenly encountered and the frame members 4 commence to move vertically the stabilizer member 12, due to inertia, retards that movement thereby functioning as a vertical damper. The springs 19 cushion any jolt that might otherwise be experienced due to the dampening action of the member 12.

Figures 6 and 7 show a modified form of one mounting 8a and one extremity of a unitary stabilizer member 12 having an integral central weight thereon. One extremity of the member 12 is supported by the mounting 8a both for limited transverse and vertical movement relative to the frame member 4. A shank 13a on the stabilizer member 12 projects into the casing 9 and has a washer 20 of relatively large diameter secured as by a nut 21 on its outer extremity. 22 denotes a resilient pad, of rubber or other similar material, embedded in the casing 9 and having perforations 23 therein to afford greater elasticity and permit freer movement in all directions on the washer 20 and the outer extremity of the shank 13a. The shank 13a is normally supported in the pad 22 substantially centrally of the height of the latter and so that the washer 20 is located substantially centrally of the width of the said pad. Thus the pad permits movement of the shank 13a both transversely and vertically in the casing 9 and tends at all times to return the shank 13a and the member 12 to their normal positions shown after movement of the said member either vertically or laterally relative to the said mounting.

Figures 8 to 10, inclusive, show another modified form of one mounting 8b and one extremity of a unitary stabilizer member 12 having an integral weight centrally thereon. One extremity of the member 12 is shown supported by a mounting 8b for limited transverse and vertical movement relative to a frame member 4. Embedded in a resilient pad 22a within and bonded to the inner sides of a casing 9a, which is suitably secured to the frame member 4, is a horizontal extremity of an arm 24 which projects through an opening formed in the inner face of the said casing, extends downwardly intermediately of its length, and is usually horizontally offset at its lower extremity. The lower extremity of the arm 24 is apertured for the passage of a shank 13b therethrough which projects from one extremity of the stabilizer member 12, and the outer end of the shank is usually threaded to receive a nut 25. Mounted on the shank and bearing against the arm 24 on the side of the latter adjacent the weight is a washer 26, and extending around the shank 13b between the said washer and the adjacent end of the weight is a helical spring 27. The pad 22a permits vertical movement of the arm 24 and thus the stabilizer member 12, and the latter is permitted lateral movement relative to the arm 24 by the spring 27.

Figures 11 to 13, inclusive, shows another modification wherein a stabilizer member 12a is supported between mountings 8c for limited vertical movement but is held by the said mountings against transverse movement between the frames 4. Each mounting 8c includes a casing 9b secured to one of the frame members 4 and having a cover 10b fastened thereon. The stabilizer member 12a in this instance consists of a tubular housing 28 closed at its extremities and having a weight 29 therein which is longitudinally movable therein and is normally held centrally of the length of the housing by springs 30. Extending outwardly from the closed extremities of the member 12a are vertical guides 31 which are adapted to move vertically against the adjacent faces of the casings 9b. Also projecting outwardly from the closed extremities of the housing 28 are tongues 32 which are embedded in resilient pads 22b which have suitable apertures 23b therein and are supported in the casings 9b. In this instance the weight 29 is adapted to move longitudinally in the housing 28 to offset skidding tendency, and the tongues 32, and thus the entire stabilizer member 12a, are adapted to move substantially vertically in the pads 22b to dampen vertical movement of the frame members 4.

Figures 14 to 16, inclusive, show a stabilizer member 12a supported between mountings 8d for limited vertical movement but held against transverse movement between the frame members 4. Each mounting 8b includes a casing 9d secured to one of the frame members 4 and having a cover 10d fastened thereon. In this instance the tranversely immovable stabilizer member 12a a tubular housing 28a closed at its extremities and having two weights 29a thereon spaced by a central helical spring 30a. The weights are normally retained equidistant from the extremities of the housing by other springs 30b. Vertical guides 31a again extend outwardly from opposite ends of the member 12a and are adapted to move vertically against the adjacent faces of the casing 9d. Extending vertically through the casings 9d and the caps 10d are bolts 34 which pass through tongues 32a which project from and are integral with the extremities of the stabilizer member 12a, and mounted in the casings 9d around the bolts 34 both above and beneath the tongues 32a are helical springs 35 which tend to retain the said tongues centrally of the height of the casings but permit limited vertical movement of the stabilizer member relative to the mountings 8d.

Figures 17 and 18 show an arrangement similar to that in Figures 8 to 10, inclusive, except that the arms 24e are rigidly secured to the extremities of the tubular casing 28e of the stabilizer member 12a so that while substantially vertical movement of the arms is permitted in the resilient pads 22e which are bonded to the casings 9e, lateral movement of the stabilizer member 12a is prevented as one or more weights (not shown) are mounted for movement in stabilizer member as shown either in Figure 11 or Figure 14.

What I claim is:

1. A stabilizer for vehicle bodies including casings rigidly secured in horizontal alignment on opposite sides of a vehicle frame, a weighted member having integral aligned shanks projecting from opposite ends thereof and extending into said casings, an enlargement on the outer extremity of each shank, a resilient pad in each casing having a bore extending therethrough to receive said shanks with said enlargements being imbedded within said pads approximately in the centers thereof whereby said shanks and enlargements are movable vertically and horizontally in said casings and pressure is exerted both horizontally and vertically on the shanks and enlargements tending to retain the same centrally in their casings and in horizontal alignment.

2. A stabilizer for vehicle bodies including casings rigidly secured in horizontal alignment on opposite sides of a vehicle frame, a weighted member having integral aligned shanks projecting from opposite ends thereof and extending into said casings, an enlargement on the outer extremity of each shank, a resilient pad in each casing having a bore extending therethrough to receive said shanks with said enlargements being imbedded within said pads approximately in the centers thereof, perforations being arranged in the body of said pads around and spaced from said bores whereby said shanks and enlargements are movable vertically and horizontally in said casings and pressure is exerted both horizontally and vertically on the shanks and enlargements tending to retain the same centrally in their casings and in horizontal alignment.

3. A stabilizer device for vehicles including mountings adapted to be rigidly secured to opposite sides of a vehicle frame, a weighted member, and resilient means in said mountings supporting the opposite extremities of said member for vertical and horizontal movement whereby the vertical center line of the member is adapted either to move nearer to one mounting than the other while its longitudinal axis either remains horizontal or assumes an inclined position, or to remain central between the mountings while its longitudinal axis becomes inclined to the horizontal, said resilient means including springs in each mounting exerting vertical pressure in opposite directions on one extremity of the member, and a spring in each mounting exerting inward pressure substantially horizontally on the adjacent extremity of the member, and said springs tending to retain said member horizontally and centrally positioned between said mountings.

4. A stabilizer device for vehicles including mountings adapted to be rigidly secured to opposite sides of a vehicle frame, a weighted member having outwardly projecting integral shanks on its extremities, each shank projecting into one of the mountings and having an enlarged portion thereon, resilient means including vertically opposed springs in each mounting for supporting and limiting vertical movement of the shank therein in either direction, and a horizontal spring in each mounting urging the enlarged portion of the shank inwardly.

References Cited in the file of this patent

UNITED STATES PATENTS

| | | |
|---|---|---|
| 989,958 | Frahm | Apr. 18, 1911 |
| 1,685,430 | Masury | Sept. 25, 1928 |
| 1,867,686 | Tibbetts | July 19, 1932 |
| 2,016,207 | Lindenberg | Oct. 1, 1935 |
| 2,018,870 | Paton | Oct. 29, 1935 |
| 2,155,130 | Hanel | Apr. 18, 1939 |
| 2,614,896 | Pierce | Oct. 21, 1952 |
| 2,618,492 | Singer | Nov. 18, 1952 |

FOREIGN PATENTS

| | | |
|---|---|---|
| 1,031,776 | France | Mar. 25, 1953 |
| 481,654 | Great Britain | Mar. 15, 1938 |